United States Patent [19]
Popenoe

[11] 3,987,699
[45] Oct. 26, 1976

[54] OPTI-MECHANICAL DISPLACEMENT MICROINDICATOR

[76] Inventor: Charles H. Popenoe, 6307 Wiscasset Road, Bethesda, Md.

[22] Filed: Nov. 14, 1974

[21] Appl. No.: 523,681

[52] U.S. Cl. .............................. 85/62; 116/DIG. 34
[51] Int. Cl.² ................... F16B 31/02; G01D 21/00
[58] Field of Search ................ 116/DIG. 34, 114 R; 73/88 F, 88 E; 85/62

[56] References Cited
UNITED STATES PATENTS

| | | | |
|---|---|---|---|
| 3,133,468 | 5/1964 | Cumming | 85/62 |
| 3,850,133 | 11/1974 | Johnson | 73/88 F |

FOREIGN PATENTS OR APPLICATIONS

| | | | |
|---|---|---|---|
| N147,51X | 6/1956 | Germany | 116/DIG. 34 |

*Primary Examiner*—Richard C. Queisser
*Assistant Examiner*—Daniel M. Yasich
*Attorney, Agent, or Firm*—George J. Neilan

[57] ABSTRACT

An indicator for optically indicating small displacements or changes in displacement of one member relative to another member, comprising a self-contained container encapsulating a light absorbing indicator fluid, a window in the container for viewing the indicator fluid, an opposite wall portion, and a flexible portion in between the window portion and the wall portion, allowing relative movement therebetween so that an external member, fixed to one of the portions may deform the container and change the thickness of the fluid seen through the window in response to changes in displacement between the first two members.

21 Claims, 11 Drawing Figures

OPTI-MECHANICAL DISPLACEMENT MICROINDICATOR

BACKGROUND OF THE INVENTION

The present invention relates to displacement indicators and, more particularly, to opti-mechanical indicators by means of which very small displacements or movements of one member relative to another are indicated via a change in intensity or color of an indicator.

There are many situations where the indication of very small distances or displacements is needed. Prior to the present invention, precision gauging instruments, such as micrometers, dial indicators, feeler gauges, and electronic indicators, were required to accomplish the precise setting or indicating of minute displacements in the order of 0.0001 inch (2.5μm). It would obviously be preferable, especially in the field, if such instruments or gauges were not needed, and if the adjustments could be set visually to within acceptable limits with the aid of a built-in indicating device.

One advantageous utilization of the indicators of the present invention is as a stress-strain indicator in applications such as described in my U.S. Pat. No. 3,602,186 and in U.S. Pat. No. 3,799,108 to Mosow. The utilization of such strain indicators more fully than at present has been hindered by such factors as cost, and complexity in design and manufacture. The Mosow patent discusses various problems associated with producing the indicator of my earlier patent. In an effort to overcome such problems, Mosow proposes a complex manufacturing and assembly process which includes making subassemblies in which the indicator fluid is encapsulated with an indicator area attached to a pin member, prior to uniting with a threaded bolt subassembly.

SUMMARY OF THE INVENTION

The present invention has as its primary object to provide a novel, economical displacement indicator which is an improvement over those indicators utilized heretofore. Another object of the invention is to provide a displacement indicator comprising a self-contained container for the light absorbing indicator fluid which facilitates manufacture and use of the indicator. Still another object of this invention is to provide a novel displacement indicator which is useful for economically indicating minute displacements between two members or for transducing other variables such as temperature or pressure into small displacements which are then visually indicated.

Briefly, a microindicator of the present invention may be in the form of a container or absorption cell containing a light absorbing indicator fluid enclosed between two substantially transparent windows or between one such window and a light reflecting surface. The container includes a flexible portion such as a flexible wall or bellows which permits relative movment between the viewing window and the opposite surface of the container. In addition, this flexible portion allows for thermal expansion of the absorbing fluid while preventing leakage of fluid into or out of the enclosed interior volume of the container.

An actuating member attached to one of the two members between which relative displacement is to be measured is positioned to bear against or is fastened to the outside of the container. Relative displacement between these two members causes the actuating member to deform the container and change the thickness of the indicating fluid as seen through the window thereby producing a visual change in color. The indicating fluid may be a dark color which when present in a layer of sufficient thickness completely obscures an underlying color, for example, a fluorescent red-orange or other bright colored surface which may be either an interior surface of the container or the adjacent surface of the actuating member. When the thickness of the indicating fluid is sufficient reduced, the underlying bright color shows through thereby producing a dramatic color change which may take place due to a very small displacement. Such displacements may also be indicated by a change in intensity of color rather than by a change from one color to another. The viewing window of the container is attached to one of the two members whose relative displacement is to be measured. An opposed planar wall portion of the container is attached to the other member so that relative displacement between the two members results in the actuating member acting upon the container to change the thickness of the fluid layer and produce a change in the intensity or color of the light transmitted through the layer. In some applications, depending upon the direction of the displacement, the actuating member may be moved in a direction to permit an increase rather than a decrease in the thickness of the fluid, and in this fashion change the intensity or color of the transmitted light.

The microindicator of the invention may be attached to two members of an assembly (or to different portions of a single member) in such a fashion that when visually examined at a later date, it may be ascertained if a relative movement has occurred between such members in the interim. For instance, the displacement indicators of the invention may be employed in mine roof bolts which are affixed in an unstressed condition into holes bored into a mine roof. Any shifting of rock masses or movement of the roof would be instantly indicated and graphic evidence of the severity and extent of the movement would be observable by the mine workers. The indicator of the invention might be employed in many other devices which measure or indicate small displacements or which transduce other variables such as temperature or pressure into small displacements. For example, my microindicator may be incorporated into a load-indicating or direct tension-indicating fastener, such as that described in my above-mentioned U.S. Pat. No. 3,602,186.

The principle of the invention follows Lambert's Law of Absorption, which states that the amount of radiation absorbed in a given layer of an absorbing medium is proportional to the intensity of the incident radiation and the thickness of the absorbing layer, or $$\frac{I}{I_o} = e^{-kt}$$

where $I$ is the intensity after passing through the medium, $I_o$ is the intensity of the incident radiation, $t$ is the thickness of the absorbing layer and $k$ the coefficient of absorption of the absorbing medium. Noting that if we define $$t' = \frac{t}{t^*},$$

$t'$ is a nondimensional thickness such that $t' = 1$ when $I/I_o = 1/e$, and $t$ is a characteristic thickness of the absorbing layer which allows $1/e$ of the incident radiation $I_o$ to be transmitted, we may write $$\frac{I}{I_o} = e^{-t'}$$

where $t' = t/t^*$.

In practice, microindicators have been constructed with a fluorescent red-orange reflecting surface and a dark blue absorbing fluid with a measured characteristic thickness of about 0.0001 inch (2.5μm). These indicators change color completely from red to black within 0.0008 inch (20μm), and using such an indicator, one may repeatably establish distances on the order of 10% of the indicator range (0.0001 inch or 2.5μm), by visual observation alone. Photoelectric detection of the transmitted or reflected radiation allows an order of magnitude improvement in precision. With photoelectric means, the microindicated distance may be repeatedly set to within 10 μinches (.25μm) with a standard deviation of about 5 μinches (.13μm).

According to one easily produced embodiment, the microindicator container may be constructed by sealing two discs of clear flexible plastic together at the edges to enclose a thin layer of absorbing fluid therein. In other embodiments, one of the discs may be colored or reflective while the other disc is transparent. Also one of the discs may be rigid while the other is flexible. Alternatively, both discs may be made of a rigid material and connected by a flexible member which permits the discs to move toward and away from each other.

For extended temperature and pressure operation, the containers may be made with a bellows made from a heat resistant material which seals the cell while permitting the required relative movement to vary the thickness of the absorbing medium and allowing for thermal expansion of the fluid.

The above and other objects, features and advantages of the invention will become more apparent as this description proceeds.

DETAILED DESCRIPTION OF THE INVENTION

Figure 1:
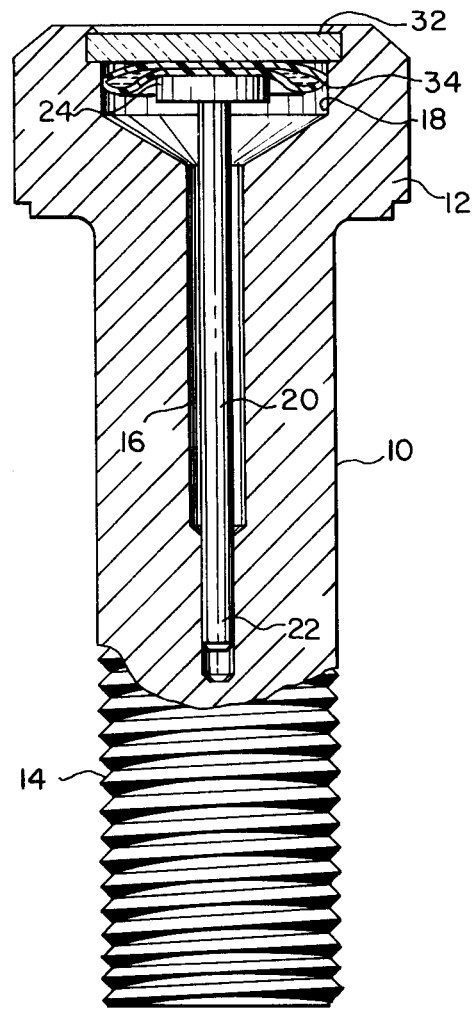
FIG. 1 is an elevational cross sectional view of one embodiment of the present invention showing the indicator utilized as a tension indicator in a fastener.

Referring now to the drawings and, more particularly, to FIG. 1, reference numeral 10 generally designates a bolt containing an indicator in accordance with the present invention. The bolt has a head 12 usually in the form of a square or hexagon so that it may be turned with a wrench, and a lower threaded end 14 for insertion into the threaded hole of a member to be fastened, or alternatively for use with a nut to fasten two mechanical members together in conventional fashion. An axial bore 16 extends from the head of the bolt to a point near the threaded end of the bolt and is countersunk to provide a large bore or recess 18 in head 12. An actuating pin or rod 20 is inserted into the bore 16 and fastened to the bolt at its lower end 22, for example, by means of an adhesive or a friction fit into a small diameter section of the axial bore 16 at its blind end. The other end of the actuating rod 20 terminates in an enlarged head or disc 24.

Figure 2:
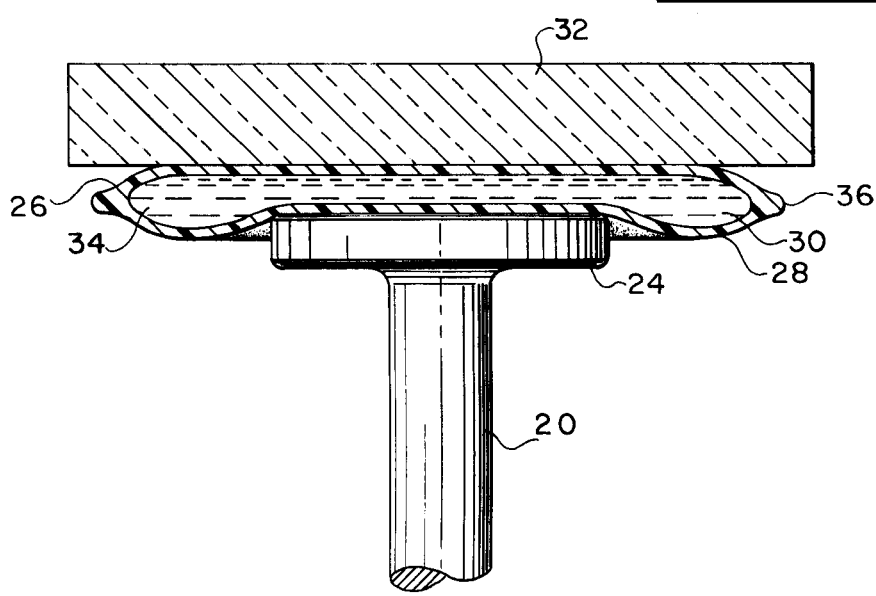
FIG. 2 is a view on an enlarged scale of a portion of the embodiment of FIG. 1 with an actuating member in a partially retracted position.

As best seen in FIG. 2, a self-contained indicating container or absorption cell 34 in accordance with the present invention is fixed to the upper surface of disc 24. The thickness of the cell in all of the drawings is greatly exaggerated for clarity. In actual practice, the thickness of the indicator container may be only several thousandths of an inch thick. This container is comprised of an upper disc or layer of clear flexible plastic 26 which is sealed to a lower colored, for example, red or orange colored flexible plastic disc or layer 28 at the periphery 36 so as to fully enclose a mass of a dark light-absorbing indicating fluid 30 which in the uncompressed condition shown in FIG. 2 is present as a layer of sufficient thickness to prevent the transmission of light therethrough. Head 24 is preferably fixed as by an adhesive to the lower disc 28. The top surface of the clear plastic disc 26 is contacted by and preferably fixed to by a clear adhesive to the lower surface of a window 32 of glass, plastic or other suitable transparent or translucent material through which the container may be seen. The window 32 is preferably inserted flush within the large bore 18 in the head of the bolt and adhesively or otherwise suitably secured in position compressing the container so that fluid 30 is displaced from between the upper disc 26 and the lower disc 28 when the fastener 10 is in the unstressed condition.

Figure 3:
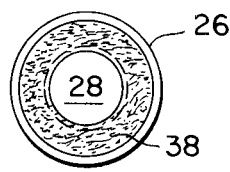
FIG. 3 is a top view of the fluid-filled indicator container of the FIG. 1 embodiment with the container compressed by an actuating member.
Figure 4:
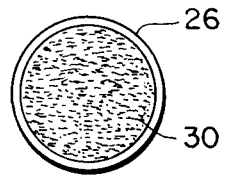
FIG. 4 is a view similar to FIG. 3, but with the container relaxed, the actuating member being in a retracted position.

In one form of use, when there is a tensile stress placed on the bolt 10 the entire shank length elongates in a direction to cause relative retraction of actuating pin or rod 20 from window 32, causing the initial compression of the plastic container in the region above disc 24 to be relaxed as shown in FIG. 2. After a small axial displacement, the thickness of fluid layer 30 is increased to the point that the fluid obscures the color of the colored plastic layer 28. In this case, as seen in FIG. 4, the circle of coloring from the lower layer 28 is no longer visible through the clear upper plastic layer 26. By comparing FIGS. 3 and 4 corresponding to cross-sections FIGS. 1 and 2 respectively, it is apparent that there is a dramatic color change and a clear visible indication of the displacement of the pin head 24 from the window 32, which is directly proportional to the stress upon the fastener. If desired, indicia may be stamped on the plastic surface 28 so as to be visible when the color of layer 28 is visible as in FIG. 4; for example, the message "LOOSE" might be inscribed on the colored layer 28. This message would only be visible when the fastener was insufficiently tightened.

If the fluid 30 is very opaque or of very high light-absorbing power, only a very thin film of fluid, in the order of between 0.0001 and 0.001 inch (2.5 and 25μm) is sufficient to suddenly and dramatically change the appearance of the indicator area as seen through window 32 from light to dark.

If desired, a match color area may be applied to the indicator, to facilitate setting an exact displacement by various operators. For instance, the annular area 38 of FIG. 3 surrounding the circular indicating area 28 may be colored a shade in between the colors of disc 28 and fluid 30, this shade being a target color towards which an operator attempts to match the color of indicating area 28 by compressing the container 34. The match color area, if opaque, will obscure the color of the fluid 30 as observed through the clear upper layer 26, and will match the color of the indicator area 28 at only one degree of compression of the microindicator thus allowing the indicated displacement to be set to a degree of precision not normally attainable by visual means alone.

The flexibility of the plastic layers 26 and 28 permits the container to bulge out around the periphery of disc 24 in order to compensate for the compression of the container above the disc 24, thus containing the displaced fluid, without rupturing the container.

If desired, the lower plastic layer 28 could also be a clear plastic layer similar to the upper layer 26. In this case, the color which is intended to show through the window 32 upon the event of displacement would be on the upper surface of disc 24.

Figure 5:
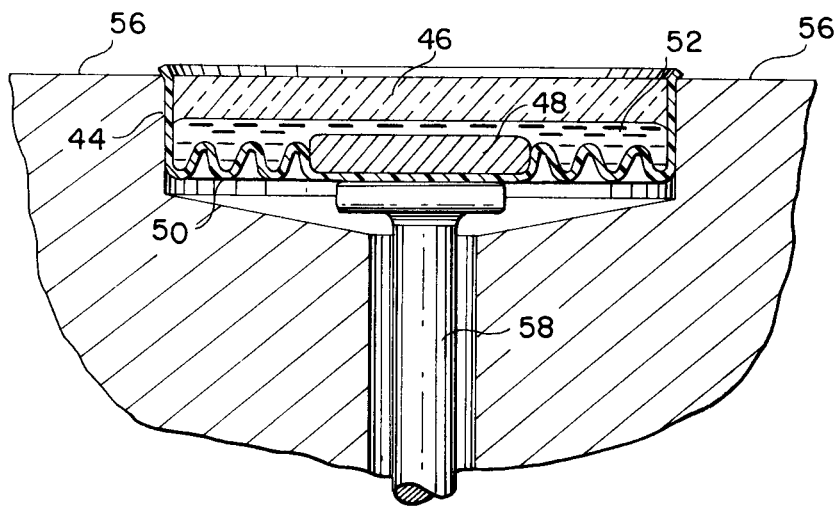
FIG. 5 is an elevational cross sectional view of an embodiment of the invention in which the container has a flexible bellows.

FIG. 5 illustrates an embodiment of the indicator comprising a container 44 with an upper transparent window or disc 46, a smaller, colored lower disc 48, and an accordion-like flexible bellows 50 uniting discs 46 and 48 to form a closed container for a light-absorbing indicator fluid 52. If desired, the window portion may be adhesively secured to wall portions 56 of one of the members whose relative displacement is to be measured. Since in this embodiment the upper disc 46 may be rigid and is adhesively secured in position, an upper window such as window 32 of the FIG. 1 embodiment bearing on the upper surface of the container may be dispensed with. It will be understood that, in use, an actuating member 58 will bear against the undersurface of the smaller disc 48, and the bellows will expand or contract to accommodate changes in the distance between the discs 46 and 48.

Figure 6:
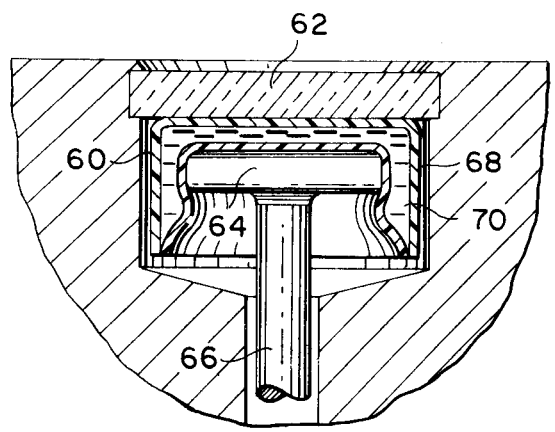
FIG. 6 is an elevational cross sectional view of a cupshaped microindicator.

Referring to FIG. 6, reference numeral 60 indicates an inverted cup-shaped absorption cell or indicator container made of a flexible plastic material. The container 60 has its central portion disposed between a window 62 similar to the window 32 of the FIG. 1 embodiment and a disc 64 on an actuating pin or rod 66. The peripheral edge portions 68 of the container depend down around disc 64 so that when the disc 64 is elevated, reducing the thickness of the light-absorbing fluid 70 beneath window 62, the peripheral edge portions 68 of the container may expand to accommodate the displaced fluid. This embodiment reduces the overall diameter of the microindicator without decreasing the diameter of the observed indicating area, i.e., the area of disc 64.

Figure 7:
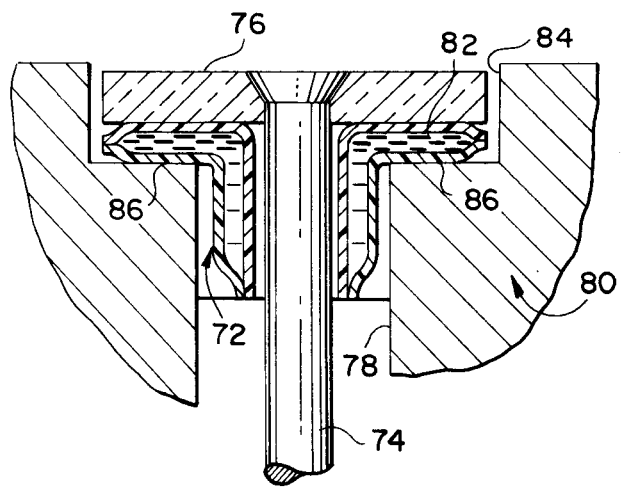
FIG. 7 is an elevational cross sectional view of an annular microindicator.

An embodiment of the invention in which the indicator is compressed by a retractile rather than an extensile movement of an actuating member is shown in FIG. 7. The absorption cell or container 72 has the form of a deformed torus. In this embodiment, the actuating pin 74 has a substantially transparent disc 76 positioned contacting the upper surface of the fluid-containing container 72. The actuating pin is disposed in a bore 78 within the member 80, and the upper flat portion 82 of the container is disposed within an enlarged bore 84 in member 80. Thus, the flat portion 82 of the container is adapted to be squeezed between the lower surface of disc 76 and the horizontal surface 86 constituting the bottom of bore 84 when there is relative displacement between member 80 and actuating member 74. Upon displacement, the fluid in the horizontal flat portion 82 of the container is squeezed down into the lower portion of the container disposed annularly about actuating pin 74.

Figure 8:
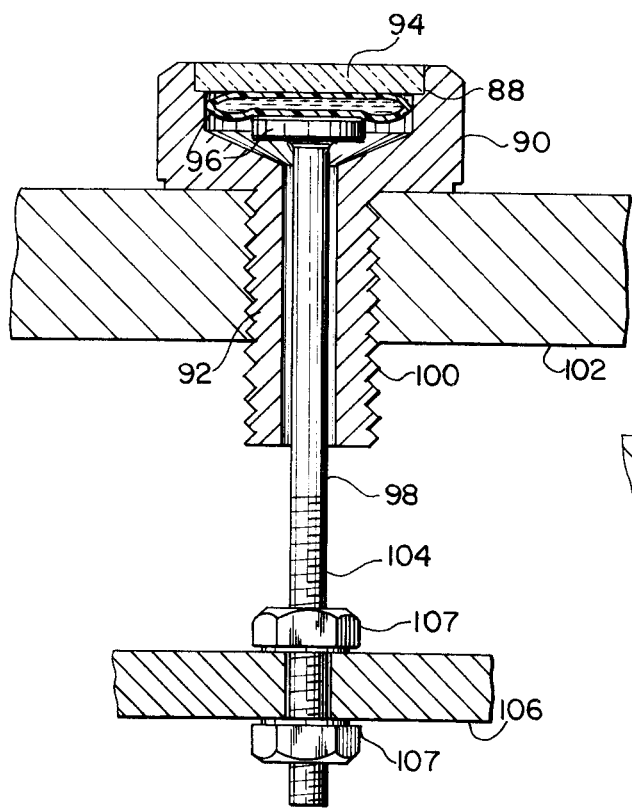
FIG. 8 is an elevational cross sectional view of an embodiment of a complete general purpose displacement indicator in which the indicator indicates displacement between two members.

FIG. 8 illustrates a further embodiment of the invention, a general purpose displacement indicator in which a fluid filled absorption cell or container 88 is disposed in a recess in the head 90 of a threaded member 92 beneath a transparent window 94. The undersurface of container 88 rests upon and is preferably fixed to a disc 96 on the end of an actuating rod 98. Member 92 has threads 100 which engage with complementary threads on a first member 102. The other end of actuating rod 98 extends beyond the threaded end of the bolt and has threads 104 which engage a second member 106, by means of adjustment nuts 107. When there is relative displacement of the member 106 towards the member 102, the actuating rod 98 is elevated from the position shown in FIG. 8 to compress the container 88 and thereby provide an indication of the displacement.

Figure 9:
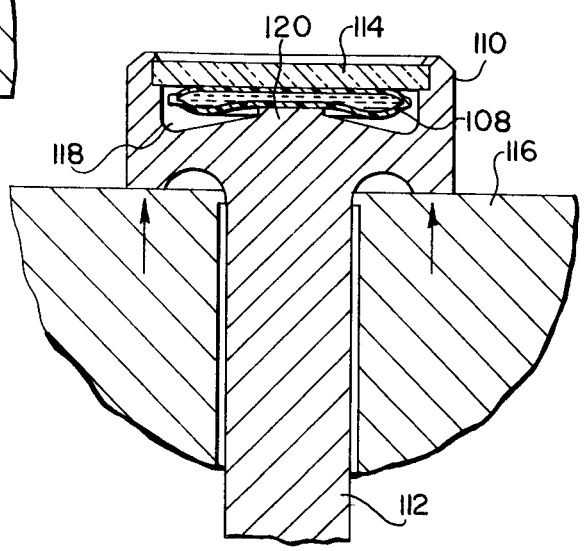
FIG. 9 is an elevational cross sectional view of an embodiment of the invention in which the indicator is entirely mounted within the head of a bolt.

In the embodiment of FIG. 9, a light absorbing cell or indicator container 108 is positioned in the head 110 of a bolt 112 beneath a transparent window 114. The lower periphery of the head 110 of the bolt rests upon the surface of a member 116 against which the bolt is tightened. The head includes a reduced thickness deflectable web portion 118 so that when there is an applied stress causing the shank part of bolt 112 to be displaced downwardly relative to member 116 and the periphery of the lower portion of the head 110, the web portion 118 deflects similarly to a Belleville washer, changing the thickness of container 108 between the transparent window 114 and the raised disc 120 beneath the container.

Figure 10:
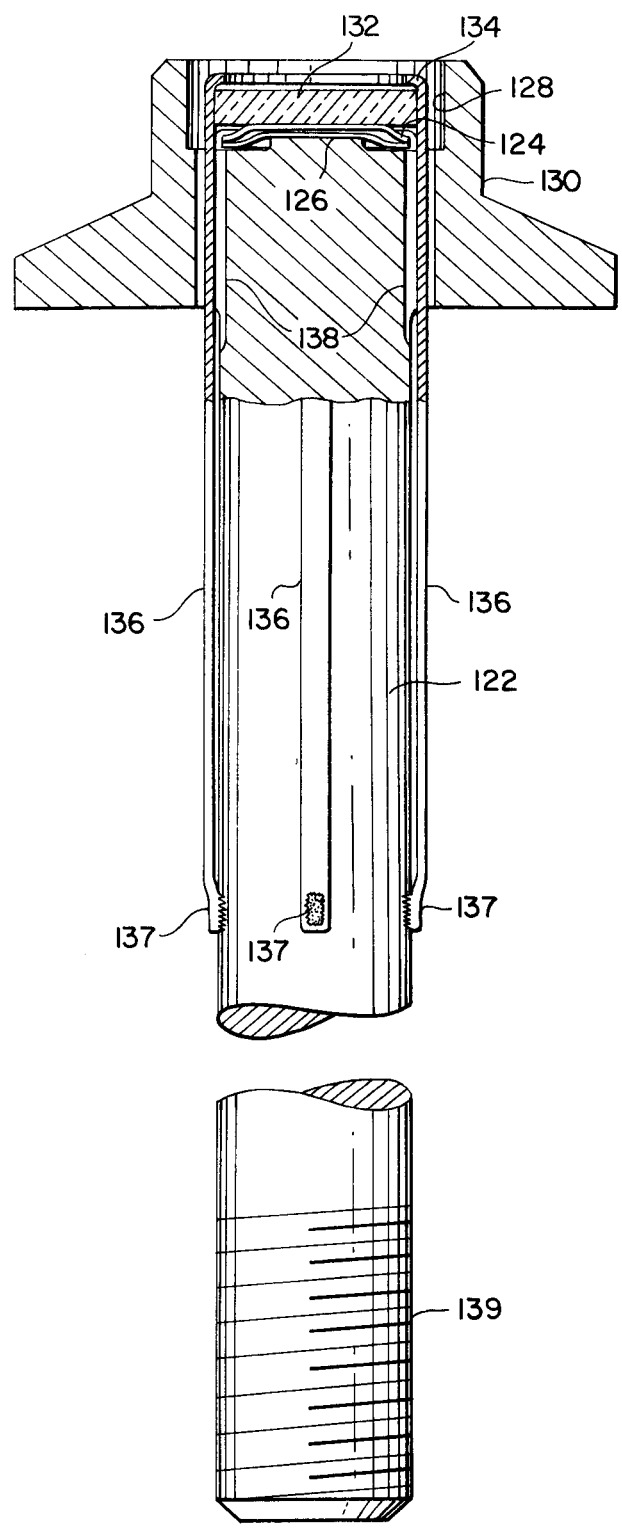
FIG. 10 is a view partly in section showing an indicator of the invention incorporated into a mine roof or rock bolt with the actuating members totally outside the body of the bolt.

FIG. 10 illustrates another application of the invention to a fastener, in which the indicator is compressed, rather than relaxed, as the tension on the fastener is increased, causing a bright-colored indication when the tensile load on the fastener reaches a predetermined level. An additional advantage provided by this embodiment is that a very sensitive indication of the predetermined tensile indicating load may be realized without the necessity of drilling a deep hole into the body of the fastener as is necessary in the embodiments of FIGS. 1, 5, 6, and 7, as the actuating members lie entirely outside of the shank of the fastener.

Referring to FIG. 10, the invention is shown applied to a safety mine roof bolt or rock bolt 122. The indicator container 124 is preferably fastened adhesively to raised disc 126 at the bottom of recess 128 sunk into the head 130 of the bolt. The upper clear layer of the indicator container 124 is fastened to transparent window 132 as by a clear adhesive. Window 132 is secured into ferrule 134, which has a number of elongated actuating members 136 secured at their upper ends about its periphery. The lower ends of actuating members 136 are fastened at points 137 on the shank of the bolt towards the threaded end 139 as by spot or projection welding. The actuating members 136 pass through openings or grooves 138 in the bolt head 130 which connect the recess 128 with the underside of head 130 at the intersection of the head and the shank, and are formed to lie closely along the shank of the bolt, or alternatively may lie loosely in shallow grooves formed into the shank, so as to present a flush surface to the shank part of the bolt. The free space between the indicator subassembly and the recess 128 and the openings 138 may if desired be filled with a flexible compound, such as silicone rubber, for sealing the working parts against the adverse effects of moisture and dust contamination.

In operation, the indicator is initially relaxed and appears dark or black when the bolt is untensioned. When a tensile load is applied, the shank of the bolt elongates between points 137 and head 130. As the ferrule and window subassembly 132 and 134 is free to move relatively to the bolt head 130, actuating members 136 pull window 132 towards disc 126 compressing indicator 124 and, at the indicating load, the bright color of the indicator disc appears providing visual evidence of the load upon the bolt.

Figure 11:
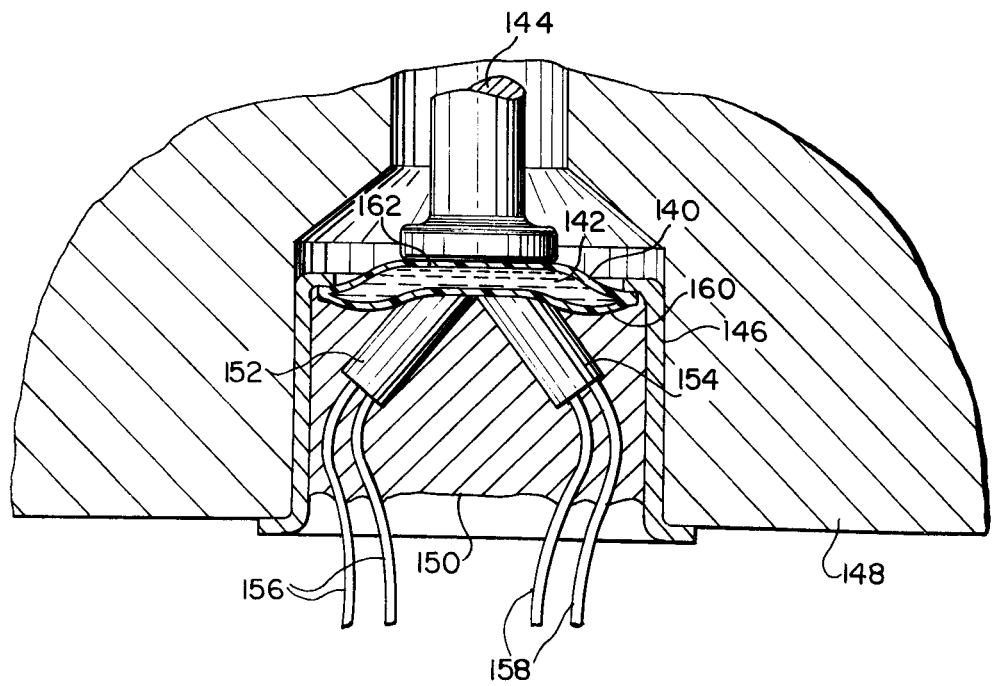
FIG. 11 is an elevational cross sectional view of an embodiment utilizing a detector to measure light or radiation passing through the microindicator.

FIG. 11 illustrates an embodiment of the invention in which a measuring device is employed to detect changes in visible light or radiation passing through the microindicator container as a result of changes in thickness in the fluid. In this embodiment an indicator container 140 containing a light absorbing fluid 142 is disposed beneath a first member 144 which contacts the upper surface of the container. The outer periphery of the container is sealed to a metal container 146 similar to a transistor can attached to a second member 148 whose displacement relative to first member 144 is to be measured. Sealed within the container 146 by an encapsulant 150 is a light or radiation emitter 152, such as an incandescent lamp or light-emitting diode. The emitter is designed to project light upwardly through the transparent layer 160 of the container 140, through the liquid 142, and then the light is reflected off a reflective top layer 162 of container 140 downwardly back through the liquid 142 to the detector 154. There are electrical leads 156 to the emitter 152 and electrical leads 158 from the detector 154. The detector may be for example a photo transistor, a photo diode, or a photoconductive cell. The detector may be connected to a suitable readout device.

From the foregoing description of illustrative embodiments of the invention, it will be evident that the microindicator of this invention can be employed in a wide variety of applications. The term displacement indicator is thus used in a generic sense and is intended to encompass all such applications of the invention including, for example, not only applications in which actual displacement between two parts are measured but applications in which stress or strain is measured. Other applications of the invention comprise placing the indicator in an unstressed condition in a structure or mechanism which may be subject to successive stresses such as a mine roof, bridge, a critical portion of an airplane wing, etc. If these parts become stressed or strained to a dangerous condition, the device can be calibrated so that this will be shown by a color change in the indicator which can be seen by visual examination without the use of additional tools of indicating devices.

It should be emphasized that this microindicator may be used to produce changes in intensity not only visible light, but also infra-red, ultra-violet, beta radiation, X-rays, or indeed any wavelength of electromagnetic radiation which is desired and according to the absorbing fluid. Therefore, the use of the term "light" in this specification and claims, shall not be limited to visible radiation, but shall refer to radiation in any part of the electromagnetic spectrum.

I claim:

1. A displacement microindicator for indicating small relative displacement between two external elements in the form of a thin sealed container comprising a light transmitting window portion through which light may pass, an opposite wall portion, and a flexible portion joining said window portion and said opposite wall portion closely adjacent to each other in fluid-tight fashion while permitting relative movement therebetween, a light-absorbing fluid within said sealed container and capable of flowing between said window portion and said opposite wall portion, said container containing essentially only said fluid, means for attaching said window portion to one external element, and means for attaching said opposite wall portion to another external element so that relative displacement between the two elements varies the thickness of a layer of said fluid between said window portion and said opposite wall portion and consequently the amount of light passing therethrough.

2. An indicator according to claim 1, wherein said flexible portion comprises a bellows.

3. An indicator according to claim 1, wherein said container is cup-shaped and the flexible portion comprises peripheral edge portions depending down around said opposite wall portion.

4. An indicator according to claim 1, wherein said opposite wall portion is transparent to light, and wherein said window portion and said opposite wall portion are separated from each other only by a layer of said light-absorbing fluid, and indicator means contacting the exterior of said opposite wall portion.

5. An indicator according to claim 1, wherein the thickness of said container is in the order of several thousandths of an inch.

6. Opti-mechanical displacement indicator apparatus comprising a first member and a second member between which displacements are to be measured, one of said members having a window, said first member being provided with a bore, a thin indicator fluid container disposed within said bore, said container containing essentially only a light-absorbing fluid, said container having a light transmitting window portion for the passage of light therethrough, said container having a flexible portion to permit relative movement between said window portion and an opposite wall of said container which is positioned closely adjacent said window portion, said first member having a portion bearing against said container, and actuating means attached to said second member and movable within said bore upon relative displacement between said first member and said second member to compress said container and vary the thickness of a thin layer of said light absorbing fluid between said window portion and said opposite wall portion responsive to displacement between said first member and said second member.

7. Apparatus according to claim 6, wherein said actuating means includes a rod having one end connected to said second member, and said first member being provided with a bore through which said rod extends.

8. A displacement microindicator for indicating small relative displacement between two external elements in the form of a sealed container comprising a pair of discs sealed to each other at their outer peripheries and one of the discs having a light transmitting window portion through which light may pass, the other disc including an opposite wall portion, and a flexible portion joining said window portion and said opposite wall portion in fluid-tight fashion while permitting relative movement therebetween, a light-absorbing fluid within said sealed container and capable of flowing between said window portion and said opposite wall portion, means for attaching said window portion to one external element, and means for attaching said opposite wall portion to another external element so that relative displacement between the two elements varies the thickness of a layer of said fluid between said window portion and said opposite wall portion and consequently the amount of light passing therethrough.

9. An indicator according to claim 8, wherein said discs are both light transmitting.

10. An indicator according to claim 8, wherein one of said discs is made of a light transmitting material and constitutes said window portion and the other of said discs has a light-reflecting surface.

11. An indicator according to claim 10, wherein said window portion has a colored match area of a shade in between that of said light-absorbing fluid and said light reflecting surface.

12. An opti-mechanical strain indicator comprising a first member and a second unstressed member fixed to each other at one point and moveable relative to each other at another point when said first member is elastically deformed, an indicator fluid container having portions attached to both said first and second members, said container containing essentially only a light-absorbing indicator fluid, one of the portions of said container being a light transmitting window portion through which light may pass, another portion of said container including a flexible portion to enable deformation of said container, said container having an opposite wall portion, the distance between said window portion and said opposite wall portion and the thickness of the absorbing fluid between said window portion and said opposite wall portion varying in response to relative movement to thereby indicate the extent of relative movement between said first member and said second member.

13. Apparatus according to claim 12, wherein said container is made of a flexible plastic material.

14. Apparatus according to claim 12, wherein said flexible portion of said container is a bellows.

15. Apparatus according to claim 12, wherein said first member has a light transmitting member attached to said container.

16. Apparatus according to claim 12, wherein said container is provided with a central bore extending therethrough, and wherein a portion of said second member extends through said bore in said container.

17. Apparatus according to claim 12, wherein said second member comprises an actuating rod, and further comprising an indicia portion on the end of said rod engaging said container so that upon relative displacement between said first member and said second member to compress said container said indicia is visible through said window portion of said container.

18. Apparatus according to claim 12, wherein said first member is a tensile fastener and said second member lies outside the shank portion of said first member and contacts the window portion of said container.

19. An indicator according to claim 12, wherein said first member is a deformable portion of a fastener head.

20. Apparatus according to claim 12, wherein said second member has a light transmitting member attached to said container.

21. A displacement microindicator for indicating small relative displacement between two external elements in the form of a sealed container comprising a light transmitting window portion through which light may pass, an opposite wall portion, and a flexible portion joining said window portion and said opposite wall portion in fluid-tight fashion while permitting relative movement therebetween, a light-abosrbing fluid within said sealed container and capable of flowing between said window portin and said opposite wall portion, said container being provided with a central passageway extending therethrough for permitting one external element to pass therethrough, means for attaching said window portion to said one external element, and means for attaching said opposite wall portion to another external element so that relative displacement between the two elements varies the thickness of a layer of said fluid between said window portion and said opposite wall portion and consequently the amount of light passing therethrough.

* * * * *